Figure 1:
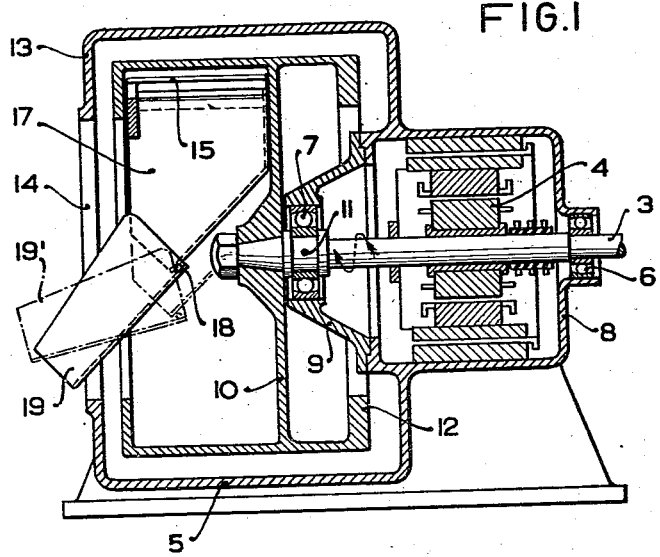

Sept. 23, 1941.   P. VAN RIEL   2,256,951

HORIZONTAL CENTRIFUGAL MACHINE

Filed Oct. 28, 1938

Inventor
Pieter van Riel
by [signature] Atty.

Patented Sept. 23, 1941

2,256,951

UNITED STATES PATENT OFFICE 2,256,951

HORIZONTAL CENTRIFUGAL MACHINE

Pieter van Riel, Delft, Netherlands, assignor to N. V. Machinefabriek "Reineveld," Delft, Netherlands, a company of the Netherlands Application October 28, 1938, Serial No. 237,530

2 Claims. (Cl. 233—22)

Horizontal centrifugal machines having discharging means which comprise a knife or like member with a chute attached thereto are generally known. Owing to the properties of the disintegrated material disengaged by the knife from the inner wall of the centrifugal drum said material is frequently prevented from sliding down on the chute, even when said latter has its greatest possible inclination. The angle of inclination of the chute is limited by the required length of the stroke of the knife as in the retracted or innermost position of the knife the chute should still project beyond the edge of the discharge opening provided in the housing in order to secure the removal of the material.

The invention has for its object to overcome said drawback and to this end the lower part of the chute is connected to the main part thereof for pivoting movement about a substantially horizontal axis extending transversally to the centrifugal shaft, said main part of the chute having such a large inclination that the material discharged thereon will slide down under all circumstances. The velocity of the material on the chute therefore increases to such a value that it can slide out of the drum on the hinged lower part of the chute even when the knife-like member is in its innermost position and the lower part of the chute has a relatively small angle of inclination owing to its contact with the edge of the discharge opening of the housing.

In order to increase the space available for the chute within the drum the base of said latter may be substantially flat and provided with a counterpose, for instance in the form of a heavy ring.

Said counterpose has advantageously such a weight that the bearing of the drum shaft is positioned in the centre of gravity of the drum. In this construction the drum may be fixed on the driving shaft, only two bearings being required for this shaft, the centre of one of which coincides with the centre of gravity of the drum. In addition to this simplification in the construction a centrifugal machine according to my invention is suited for considerably higher speeds of revolution than the known machines, as, owing to the position of centre of gravity of the drum, vibrations cannot occur. More particularly in the case of electrically driven centrifugal machines it becomes possible to mount the rotor of the electric motor directly on the drum shaft, that is to dispense with a flexible coupling, without any danger of the rotor coming into contact with the stator.

Figure 2:
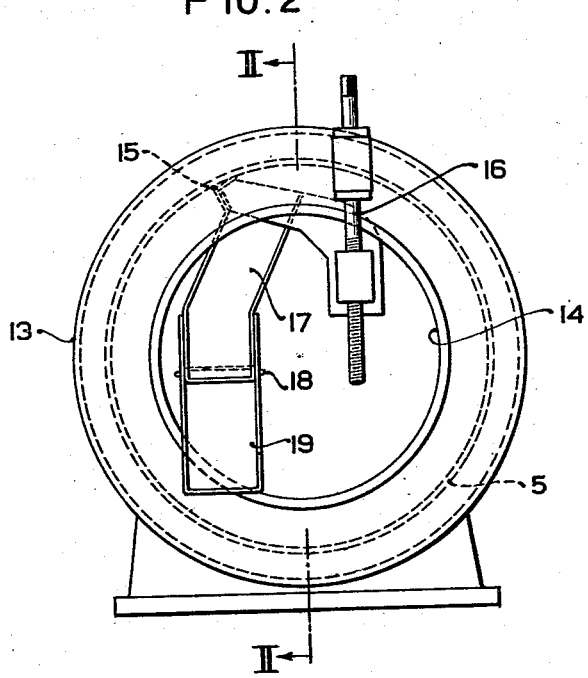

The drawing illustrates, by way of example only, an embodiment of my present invention. On this drawing:

Fig. 1 is a vertical axial sectional view of a horizontal centrifugal machine, and Fig. 2 is a front view thereof.

The horizontal shaft 3 which carries both the motor armature 4 and the centrifuge drum which latter comprises the basket proper 5, base 10 and counterpoise 12 is journalled in two bearings, 6, 7 the former of which is mounted in a cover 8 and the latter of which in the conical shaped end shield 9.

The drum base 10 is flat, except for a central thickened boss for fixing the shaft end. In order that the centre of gravity 11 of the drum shall coincide with the centre of the bearing 7, the cylindrical drum-wall is extended beyond the base 10 and is there provided with a heavy ring 12 which acts as a counterpoise.

The stationary housing 13 has a circular discharge opening 14 opposite to the base of the basket. The knife or cutting member 15 for scraping off the layer of solid material accumulated on the inner drum wall is arranged in the upper part of the interior of the drum and is adapted to be radially moved towards and away from the drum wall by means of a screw threaded rod 16. The cutting member 15 carries a relatively short chute 17 which is rigidly secured thereto and the bottom of which has such an angle of inclination that also relatively sticky material can slide down thereon under the action of its kinetic energy and its gravity.

Pivotally mounted on horizontal pins 18 extending from the chute 17 is a second chute which is adapted to discharge the disintegrated material from the centrifugal over the edge of the opening 14.

When the cutting member 15 assumes its uppermost position and nearly contacts the inner drum wall the bottom of the chute 19 which may then be supported on the edge of the opening 14 forms an extension of the bottom of the chute 17. If, however, the knife 15 is by means of the rod 16 gradually moved away from the drum wall and consequently descends the chute 19 rotates about its pivots 18 relatively to the chute 17 whereas its bottom still remains in contact with the edge of the opening 14 until it assumes the position 19' when the cutting member 15 is in its innermost position. In said position the inclination of the chute 19 is still sufficient for securing the removal of the material falling down with a relatively high speed on the chute 17.

It is to be noted that within the scope of my invention the discharge chute may also be formed of more than two parts hinged to each other.

What I claim is:

1. A centrifugal machine including a basket formed with an outlet, and a knife removable radially of the basket for scraping the accumulated material from the interior of the wall of the basket, a chute including a section rigidly connected to the knife and having a depending open end leading toward the outlet of the basket, the chute including a second section pivotally connected to the first mentioned section and forming a discharge continuation thereof, the open end of the second section extending through and beyond the outlet of the basket.

2. A construction as defined in claim 1, whereby the lower wall of the chute section rigidly connected to the knife and remote from the basket opening is inclined downwardly and outwardly toward said opening to facilitate movement of the material scraped from the basket wall.

PIETER VAN RIEL.